(12) United States Patent
Slegers et al.

(10) Patent No.: US 7,935,372 B2
(45) Date of Patent: May 3, 2011

(54) COATED SNACK PRODUCTS

(75) Inventors: Guido Slegers, Broek Op Langedijk (NL); Ingrid Dorothe Maria Ganzeboom, Vleuten (NL)

(73) Assignee: Frito-Lay Trading Company (Europe) GmbH, Bern (CH)

( * ) Notice: Subject to any disclaimer, the term of this patent is extended or adjusted under 35 U.S.C. 154(b) by 108 days.

(21) Appl. No.: 11/908,213

(22) PCT Filed: Mar. 7, 2006

(86) PCT No.: PCT/NL2006/000117
§ 371 (c)(1),
(2), (4) Date: Nov. 28, 2007

(87) PCT Pub. No.: WO2006/098613
PCT Pub. Date: Sep. 21, 2006

(65) Prior Publication Data
US 2008/0166455 A1    Jul. 10, 2008

(30) Foreign Application Priority Data
Mar. 16, 2005   (NL) ...................... 1028557

(51) Int. Cl.
*A21D 13/00*    (2006.01)
(52) U.S. Cl. .......... 426/94; 426/249; 426/275; 426/289; 426/296; 426/438; 426/549

(58) Field of Classification Search ........................ None
See application file for complete search history.

(56) References Cited

U.S. PATENT DOCUMENTS

| | | | | |
|---|---|---|---|---|
| 4,499,113 A | * | 2/1985 | Mochizuki et al. | 426/291 |
| 5,160,754 A | | 11/1992 | Hayashi et al. | |
| 5,571,546 A | * | 11/1996 | Kristinus et al. | 426/93 |

FOREIGN PATENT DOCUMENTS

| | | |
|---|---|---|
| AU | 5953980 | 4/1981 |
| EP | 0608950 A | 8/1994 |
| GB | 2102269 A | 2/1983 |
| JP | 58116665 A | 7/1983 |
| JP | 61247332 A | 11/1986 |
| NL | 9300160 A | 8/1994 |

OTHER PUBLICATIONS

Kurashima (JP 58116665—Derwent Abstract).*

* cited by examiner

*Primary Examiner* — Timothy M Speer
*Assistant Examiner* — Felicia C King
(74) *Attorney, Agent, or Firm* — Colin P. Cahoon; Celina M. Diaz; Carstens & Cahoon, LLP

(57) ABSTRACT

The invention relates to a coated snack product, and to a method for the preparation thereof. According to the invention, a snack product is prepared by coating a core with a least two coating layers, while a coating layer of a dough material located further inwards expands more strongly than an outer coating layer; the outer coating layer is broken on a part of the surface of the core; thereupon, the thus coated core is heated.

23 Claims, 1 Drawing Sheet

COATED SNACK PRODUCTS

BACKGROUND OF THE INVENTION

The invention relates to a coated snack product and to a method for the preparation thereof.

It is known to prepare all sorts of snack products by coating a core, consisting of, for instance, a peanut or a nut, with an expandable coating layer of a dough material. When the core with the coating layer, or different coating layers, is heated, the coating layer expands, or the coating layers expand, so that a crisp coating of the core is obtained.

In Dutch patent application 9300160, a method is described wherein a core, preferably peanut, is coated with at least two coating layers with a different dough composition. During heating, the inner coating layer expands more strongly than the outer coating layer, the result being that the outer coating layer breaks partly open and the inner layer comes partly to the surface. Preferably, the coating layers are different in color so that a crazed effect is formed.

The present invention contemplates providing a coated snack product of a new type, and a method for the preparation thereof, with, also, at least two coating layers applied to a core, but with a completely new exterior.

SUMMARY OF THE INVENTION

According to the invention, a snack product is prepared by coating a core with at least two coating layers, wherein a coating layer of dough material located further inwards is more strongly expandable than an outer coating layer; the outer coating layer is weakened over at least a part of the surface; and thereupon the thus coated core is heated.

As the outer coating layer is partly weakened, this outer coating layer does not burst open at other locations during heating, as was the case with a snack product according to NL 9300160, but remains intact. The greater increase in volume of the coating layer located further inwards relative to that of the outer coating layer finds, so to say, its way out at the location where the outer coating layer is weakened. As a result, a completely new and distinguishing exterior is formed with the expanded layer located further inwards emerging through the outer layer at the location of the weakening. This is interesting in particular when, before heating, not only the outer coating layer, but also the coating layer located further inwards is weakened so that a part of the surface of the core is exposed.

Incidentally, it is possible to obtain a snack product with a comparable exterior by utilizing only one coating layer, which coating layer preferably has a color that differs from, or rather still, is in contrast with the color of the core. By weakening this one coating layer over a part of the surface and then heating it, as described hereinbelow, a part of the core can become exposed. Preferably, this one coating layer is of a dough material that can be expandable or non-expandable, as described hereinbelow. Therefore, the invention also relates to a method for preparing a snack product comprising coating a core with one coating layer, preferably a coating layer of dough material, weakening the coating layer over a part of the surface and thereupon heating the thus coated core, and to a snack product obtainable with this method.

BRIEF DESCRIPTION OF THE DRAWINGS

These and other features of the invention will be elucidated in conjunction with the accompanying drawings.

DETAILED DESCRIPTION OF THE PREFERRED EMBODIMENTS

Figure 1:
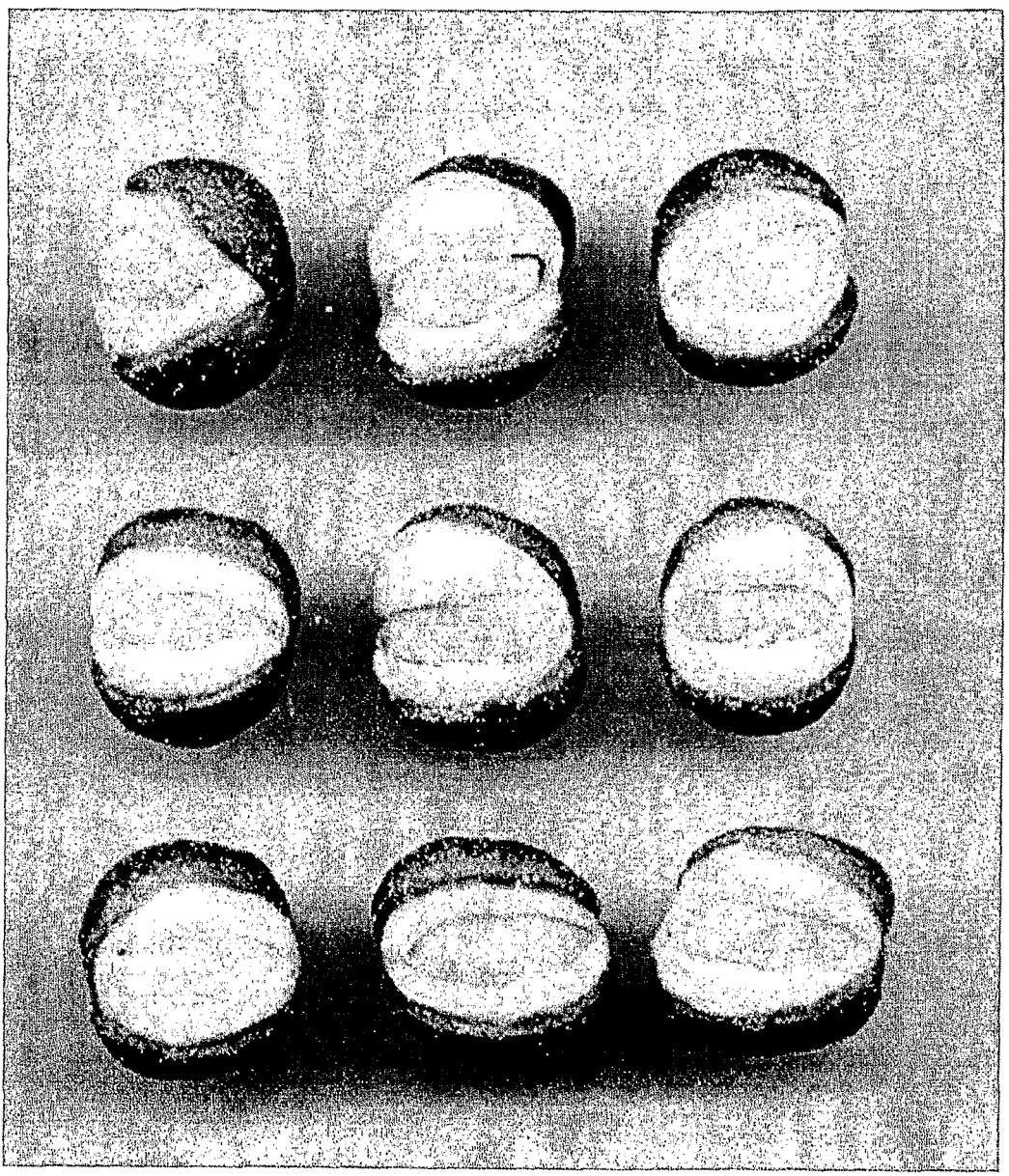
FIG. 1 illustrates one embodiment of the invention.

The core that is coated according to the invention in order to prepare a coated snack product can take on all sorts of forms. Suitable examples are peanuts, peanut-agglomerate, nut, fruit or dried fruit, cake, bread and other food fragments. It is preferred that the core consists of peanut, peanut-agglomerate or nut.

Applying the coating layers can be done in a conventional manner, with the aid of conventional equipment. The materials used for forming the coating layers are preferably applied in the form of a paste, dough or spraying liquid, through, for instance, spraying or sprinkling. The paste, the dough or the spraying liquid can be flour-based. If desired, drying can take place between application of the various coating layers, but is it also possible to apply the coating layers one over the other in wet condition. When, according to the invention, at least two coating layers are utilized, a layer located further inwards is prepared of an expandable dough material. In that case, it is of importance that upon heating, the coating layer located further inwards expands more strongly than the outer layer. In a preferred embodiment, the outer layer hardly expands, if at all. It is further preferred to use two coating layers.

To best bring out the special aspects of the exterior of a snack product according to the invention, it is preferred to have the coating layers differ from each other in colors. It is preferred that the color of the coating layer located further inwards and the color of the outer layer differ from each other, more preferably, these colors are in contrast with each other. It is further preferred that a coating layer located further inwards, preferably the innermost coating layer, has a color that differs from, or rather still, is in contrast with the color of the core. Still more preferably, all utilized coating layers have a color that differs from, or rather still, is in contrast with the color of the core. To this end, accepted food-grade colorants can be utilized, it, naturally, also being possible to have one or more coating layers keep their natural color if this differs sufficiently from the color of the other coating layers. According to the invention, the flavours of the utilized coating layers can be different from each other. To this end, optionally, different components can be utilized in different quantities in the compositions of which the coating layer are prepared.

As stated, the coating layer located further inwards is prepared of a dough material that expands upon heating. To obtain a high degree of expansion, the dough material of this layer is preferably starch-based, in particular starch selected from the group of pre-gelatinized waxy maize flour, native waxy maize flour and pre-gelatinized sticky rice flour, and combinations thereof. The choice of quantity and types of expandable components depends on the desired structure of the coating layer and on the eventual snack product. In general, the dough material for this layer will consist, for 10-50% by weight, based on dry matter, of expanding product, while the remaining 50-90% by weight consist of non-expanding components.

The outer coating layer, not or virtually not expanding upon heating, can also be prepared from a dough material, but this is not required. Other coating layers, based on, for instance, sugar are also conceivable. However, in a preferred embodiment, the outer coating layer is also prepared from a dough material, albeit that it will contain no, or virtually no expandable components. Examples of such components are pea powder (for instance suprex pea powder), rice flour, wheat flour and other flour types. Combinations of these components can also be utilized.

When only one coating layer is utilized, this may, or may not be of a dough material and may or may not expand upon heating. Preferably, this one coating layer is of a dough material that expands slightly upon heating. All coating layers can contain an amount of aroma and colorant.

This may be aromas, herbs, spices, salt or sugar, and colorants.

The amounts in which the coating layers are applied are not particularly critical, albeit that it is preferred that the coating layer located further inwards is applied in an amount approximately equal to or smaller than the amount in which the outer coating layer is applied, in a manner such that before heating, the outer coating layer is thicker than the layer located further inwards.

After all coating layers have been applied, and before heating, according to the invention, at least the outer coating layer is weakened over a part of the surface. When, during heating of the snack product, the coating layer located further inwards expands more strongly than the outer coating layer, a part of the coating layer located further inwards will be exposed along the edge of the weakening of the outer coating layer. In a preferred embodiment, all coating layers are weakened so that a part of the surface of the core is exposed. The weakening of a coating layer can be done by applying it thinner locally, or making it thinner locally. It is also possible to apply a predetermined perforation pattern in the form of; for instance, a line, so that a breaking pattern or tearing pattern is formed along which the weakened coating layer will burst open, for instance when, through heating, a coating layer located further inwards expands. Through heating, the coating layer located further inwards will expand more strongly than the outer coating layer in a manner such that a part of the coating layer located further inwards is exposed along the edge of the pattern. In a preferred embodiment, a coating layer is weakened by breaking through it. Breaking can be effected by cutting into, cutting loose or cutting out a portion of the coating layer, for instance with the aid of a wire, water jet, (optionally rotating) knife or stamp, or an ultrasonic technique, but a portion of the coating layer can also be removed through, for instance, scraping or wiping.

It is preferred to carry out the weakening of the one or outer coating layer in a manner such that after heating, at least 5% and at most 50% of the surface, preferably between 10% and 40% of the coating layer located further inwards and/or of the core, is exposed. The predetermined pattern is preferably a cross, or rather still, a line. When the pattern is a line, and all coating layers are weakened, a particularly interesting exterior is formed after heating. The outer coating layer is slightly parted at the location where it is weakened and due to expansion, the coating layer located further inwards forms a pair of lips around a mouth, as it were, in which the core of the snack product is visible.

After weakening the only or the outer coating layer, and, optionally, the coating layers located further inwards, the coated snack product is heated. Although the applied coating layers can be dried before heating, as a rule, the products will be heated in wet or moist condition. The manner of heating will depend, inter alia, on the desired temperature for expansion of in any case the coating layer located further inwards, but will generally be done in an oven or in oil. Preferably, the snack product is deep-fried. Suitable temperatures for heating are around the generally accepted temperatures for expanding dough materials and can be selected in a range of 125-200° C., preferably of 150-175° C. Upon heating in an oven or in hot air, this temperature can be slightly lower.

Depending on the flavour and structure of the desired snack product, this can, after heating, optionally be post-sprinkled with flavourings, such as herbs or salt, and/or colorants. The invention will presently be further elucidated with reference to the following example that should not be construed to be limitative.

EXAMPLE

Approximately 3 kg of peanut agglomerate were introduced into a panning drum, while approximately 1.6 kg of dusting flour consisting of 30% pre-gelatinized starch, 30% flour, 30% starch and, optionally, flavourings, were panned while, simultaneously, 1.4 kg of a sprinkling liquid were added. Then, approximately 1.6 kg of dusting flour, consisting of non-expanding rice flour, were added with the aid of 1.0 kg of spraying liquid. The first spraying liquid consisted of an aqueous solution of 8% salt, 16% sugar, flavourings and colorant. The second liquid consisted of an aqueous solution of 3% salt, 10% sugar, flavourings and colorant.

After panning, the obtained semi-finished product was provided with a cut (by means of a knife) and thereupon deep-fried for 6 minutes at 156° C. The obtained end product has a completely new and distinguishing exterior as can be seen in FIG. 1, as due to heating, the inner coating layer expands more strongly than the outer coating layer. If desired, the end product can be sprinkled with an aroma composition.

The invention claimed is:

1. A method for preparing a snack product comprising
coating a core with at least two coating layers, wherein an outer coating layer is thicker than a coating layer located further inwards, and further wherein said coating layer located further inwards is prepared of a dough material that expands upon heating;
weakening at least the outer coating layer over a part of the surface; and
thereafter heating the thus coated core such that the coating layer located further inwards expands and emerges through the outer coating layer at the location of the weakening.

2. A method according to claim 1, wherein the coating layer located further inwards is exposed along an edge of the weakening.

3. A method according to claim 1 wherein all coating layers are weakened such that upon heating, a part of the surface of the core is exposed.

4. A method according to claim 3 wherein after heating, at least 5% and at most 50% of the surface of the core is exposed at the location of the weakening.

5. A method according to claim 1 wherein at least the outer coating layer is weakened by breaking it.

6. A method according to claim 5, wherein at least the outer coating layer is broken through cutting into, cutting loose or cutting out a part of the outer coating layer.

7. A method according to claim 1 wherein the outer coating layer is weakened along a predetermined pattern.

8. A method according to claim 1 wherein the outer coating layer is not expandable.

9. A method according to claim 1 wherein heating takes place at a temperature between 125 and 200° C.

10. A method according to claim 9, wherein heating is done by deep-frying.

11. A method according to claim 1 wherein the core consists of peanut, peanut-agglomerate, nut, fruit or dried fruit, cake, bread or a different food fragment.

12. A method according to claim 1 wherein the dough material of the coating layer located further inwards contains starch, which starch is selected from the group of pre-gelatinized waxy maize flour, native waxy maize flour and pre-gelatinized sticky rice flour, and combinations thereof.

13. A method according to claim 1 wherein said coating layers are coloured differently.

14. A coated snack product prepared by the method according to claim 1.

15. A method according to claim 2 wherein after heating, at least 5% and at most 50% of the surface of the coating layer located further inwards is exposed at the location of the weakening.

16. A method according to claim 1, wherein said weakening is done by applying the outer coating layer thinner locally over said part of the surface.

17. A method according to claim 1, wherein said coating layer of a dough material located further inwards is more strongly expandable than said outer coating layer.

18. The method of claim 1 wherein said coating layers are applied by spraying.

19. A snack product comprising a core provided with at least two coating layers, wherein at least an outer coating layer is weakened along a predetermined pattern over a part of the surface, and wherein at least one coating layer located further inwards comprises dough material, wherein, through heating, a coating layer located further inwards has expanded more strongly than the outer coating layer in a manner such that a part of the coating layer located further inwards is exposed along the edge of the pattern.

20. A snack product according to claim 19, wherein at least an outer coating layer is broken along said predetermined pattern over a part of the surface.

21. A snack product according to claim 19, wherein all coating layers are weakened over a part of the surface of the core in a manner such that a part of the surface of the core is exposed.

22. A snack product according to claim 19, wherein the coating layer located further inwards is applied in an amount that is approximately equal to or smaller than the amount in which the outer coating layer is applied, such that the outer coating layer is thicker than the coating layer located further inwards.

23. A snack product according to claim 19, wherein said coating layers are of different colors.

* * * * *